United States Patent [19]

Altieri et al.

[11] Patent Number: 5,849,233

[45] Date of Patent: Dec. 15, 1998

[54] METHOD OF EXTRUDING STARCH UNDER LOW MOISTURE CONDITIONS USING FEED STARCH HAVING COARSE PARTICLE SIZE

[75] Inventors: Paul A. Altieri, Belle Mead, N.J.; Norman L. Lacourse, Indianapolis; David E. Lueck, Clayton, both of Ind.

[73] Assignee: National Starch and Chemical Investment Holding Corporation, Wilmington, Del.

[21] Appl. No.: 440,165

[22] Filed: May 12, 1995

Related U.S. Application Data

[63] Continuation of Ser. No. 69,632, Jun. 1, 1993, abandoned, which is a continuation of Ser. No. 796,739, Nov. 25, 1991, abandoned.

[51] Int. Cl.⁶ .................... B29C 47/00; C08J 9/12
[52] U.S. Cl. ............... 264/211.11; 264/211; 106/210; 127/32
[58] Field of Search ............ 264/177.11, 211.11, 264/2.23, 211.349; 106/210; 426/549, 578; 127/32

[56] References Cited

U.S. PATENT DOCUMENTS

| | | |
|---|---|---|
| 3,137,592 | 6/1964 | Protzman et al. ................ 127/32 |
| 3,753,729 | 8/1973 | Harms et al. . |
| 4,072,535 | 2/1978 | Short et al. ................ 106/210 |
| 4,218,350 | 8/1980 | Griffin ................ 264/331.17 |
| 4,567,055 | 1/1986 | Moore ................ 426/578 |
| 4,954,178 | 9/1990 | Caton ................ 426/549 |
| 5,032,337 | 7/1991 | Nachtergaele et al. ......... 264/211.11 |
| 5,035,930 | 7/1991 | Lacourse et al. ................ 106/210 |
| 5,043,196 | 8/1991 | Lacourse et al. ................ 106/210 |

FOREIGN PATENT DOCUMENTS

| | | | |
|---|---|---|---|
| 1076412 | 4/1980 | Canada ................ 99/172 |
| 63-286401 | 11/1988 | Japan . |
| 965349 | 7/1964 | United Kingdom . |

OTHER PUBLICATIONS

Shreve's Chemical Process Industries, 5th Edition, G. T. Austin, p. 571 (McGraw–Hill Book Company, Publisher).

*Primary Examiner*—Mathieu D. Vargot
*Attorney, Agent, or Firm*—Eugene Zagarella, Jr.

[57] ABSTRACT

A method of extruding starch under low moisture conditions of 25% or less by weight to form an expanded product is provided and includes feeding inlet starch to an extruder, the starch having a particle size distribution such that 30% or more by weight have a particle size of at least 180 microns. In one embodiment, the inlet feed starch is dried using a continuous belt dryer.

20 Claims, No Drawings

METHOD OF EXTRUDING STARCH UNDER LOW MOISTURE CONDITIONS USING FEED STARCH HAVING COARSE PARTICLE SIZE

This application is a continuation of application Ser. No. 08/069,632, filed Jun. 1, 1993 which, in turn, is a continuation of application Ser. No. 07/796,739, filed Nov. 25, 1991 both now abandoned.

BACKGROUND OF THE INVENTION

This invention relates to an improved method of extruding starch at a low total moisture level wherein the inlet feed comprises starch which has a selected coarse particle size distribution. This improved method of extrusion provides increased production rates and better process stability and results in more uniformity and better quality of the prepared product.

Starch materials have been used in extrusion processes to form various film, foam, food and other products. Conditions used in the different extrusion operations can vary widely depending on the particular product being made. Recently, shaped starch products prepared by the extrusion of starch under low moisture conditions have been disclosed in U.S. Pat. No. 5,035,930 issued Jul. 30, 1991.

Some processing difficulty has been seen in extruding wet-milled starch due to its inherently small particle size. Problems such as poor homogenization with water pumped into the extruder, fluidization of the starch in the feeding zone (i.e., clogging) low production rates and non-uniformity of extrudate due to "dead zones" inside the extruder barrel (i.e., non-uniformity in filling extruder) have developed. These problems are enhanced as the total moisture required for a particular application is lowered to levels below about 25%, by weight, based on the weight of starch.

The use of a preconditioner, known in the extrusion art, to blend starch with moisture gives a larger particle size agglomerated material, however, it is not useful at lower moisture levels since it does not increase particle size until the moisture is at least 25%. Several other techniques for increasing particle size are known, but are not generally applicable in low moisture extrusion processing because they result in the formation of powders having high moisture content and weak particles. Some methods such as drum-drying and sintering result in gelatinizing or cooking the starch while other heating techniques such as flash and rotary drying are not useful since particle size can't be controlled and a fine powder product results.

Accordingly, there is a need for an improved method of extruding starch at a low total moisture content wherein the inlet feed comprises a starch having a selected coarse particle size distribution.

SUMMARY OF THE INVENTION

Now in accordance with this invention an improved method of extruding starch at a low total moisture level of about 25% or less, by weight, is provided wherein the inlet feed comprises starch which has a particle size distribution such that 30% or more by weight of the starch has a particle size of at least 180 microns.

In one embodiment of this invention, the inlet feed starch to the extruder is dried using a continuous belt dryer to a low moisture content of about 25% or less, by weight, and has a particle size distribution such that 30% or more by weight of the starch, preferably 50% or more, has a particle size of at least 180 microns.

DETAILED DESCRIPTION OF THE INVENTION

The ability to extrusion process starch under low total moisture conditions is the main objective of this invention. The term total moisture (or water) content or conditions, as used herein, refers to the amount of moisture present in the inlet feed starch plus the amount of water added to the starch during processing in the extruder. The low total moisture content used in this invention will be about 25% or less by weight, based on the weight of the starch. More particularly, the amount of total moisture present in the extruder will be from about 5 to 25%, by weight, preferably from about 8 to 21% and more preferably from about 13 to 19%, by weight. The inlet starch feed which is used in the extrusion method of this invention will have 25% or less by weight moisture, more particularly 15% or less, and preferably less than about 12% by weight moisture, more preferably 10% or less by weight moisture based on the weight of the starch. A preferred range of inlet feed starch is from about 5 to 12% by weight moisture, based on the weight of the starch. Enough water will be added to the extruder to bring the total moisture content to the desired level.

In order to obtain starch feed material having the necessary particle size distribution for use in the extrusion method of this invention, the selected starch material in one embodiment of this invention is dried using a continuous belt dryer. In this method the starch material is dispersed in an aqueous slurry of e.g. 30–50% solids, and then pumped to a rotary vacuum filter to form a moist cake (e.g., 40–50% moisture). The cake is broken up to produce starch chunks which are removed from the drum (fall off by gravity) onto a moving conveyor where it passes through a dryer or oven and is dried to the desired moisture level. After drying it leaves the dryer and falls by gravity onto an auger where it is further conveyed and then blown into a storage hopper. No grinding, pulverizing or other disintegration or milling steps are needed or used with the product having the coarse particle size distribution that is needed along with a suitable moisture content making it ready for direct feed into the extruder.

The starch cake which forms on the rotary vacuum filter can be removed in different ways which are known in the art. One such technique involves the use of a string discharge where parallel strings are tied completely around the filter and pass over a discharge roll and a return roll. As the filter rotates the cake forms and covers the strings. At the discharge point the strings leave the drum on a tangential plane, lifting the cake from the cloth. When the strings pass the discharge roll, the sudden change of direction causes the cake to separate from the strings and fall by gravity. The strings then pass through an aligning comb and are guided back onto the drum by the return roll.

The dryer as used in one embodiment of this invention for reducing moisture in the starch cake is a continuous belt or conveyor dryer where material is passed on a conveyor through a long dryer, heater or oven. It is a direct-heat dryer where heat is transferred by convection, e.g., from a hot gas which may be heated by steam coils. In the drying oven, the material is initially heated at a low temperature of, e.g., about 165° F. (73° C.) and then passed through a higher temperature zone of about 200° to 260° F. (93° to 127° C.) and then a cooling zone of about 120° F. (49° C.). The drying of the starch in this non-destructive technique is also controlled by the rate of passage or conveyance through the oven which generally can be at a rate of about 0.5 to 2 ft/min. or, in typical industrial production, at about 2000 to 4000 lbs/hr. of starch material.

The coarse particle size distribution of the starch feed material that has been found desirable in extrusion processing is one wherein at least about 30% by weight of the starch will have a particle size of greater than 180 microns, i.e., will not pass through a standard 80 mesh screen (U.S. Sieve Series). Preferably at least about 50%, by weight, of the starch will have a particle size of greater than 180 microns. Generally, this means that the starch, or at least that selected portion of the starch may be of any size greater than 180 microns as long as it is of sufficient size to allow it to be fed into the extruder, such as by a screw conveyor feeder. Typically, the starch particle size can be as large as about 840 to 2000 microns (10 to 20 mesh).

The starting starch material useful in this invention may be any of several starches, native or converted. Such starches include those derived from any plant source including corn, potato, wheat, rice, sago, tapioca, waxy maize, sorghum and high amylose corn, etc. Starch flours may also be used as a starch source. Also included are the conversion products derived from any of the former bases including, for example, dextrins prepared by hydrolytic action of acid and/or heat; oxidized starches prepared by treatment with oxidants such as sodium hypochlorite; fluidity or thin boiling starches prepared by enzyme conversion or mild acid hydrolysis; and derivatized and crosslinked starches.

The starches including high amylose starch used in this invention may be unmodified or modified and the term starch as used herein includes both types. By modified it is meant that the starch can be derivatized or modified by typical processes known in the art, e.g., esterification, etherification, oxidation, acid hydrolysis, crosslinking and enzyme conversion. Typically, modified, starches include esters, such as the acetate and the half-esters of dicarboxylic acids, particularly the alkenylsuccinic acids; ethers, such as the hydroxyethyl and hydroxypropyl starches and starches reacted with hydrophobic cationic epoxides; starches oxidized with hypochlorite; starches reacted with crosslinking agents such as phosphprus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, edited by Roy L. Whistler, et al., Chapter X; Starch Derivations: Production and Uses by M. W. Rutenberg, et al., Academic Press, Inc. 1984.

In one preferred embodiment, the starch material is a high amylose starch, i.e., one containing at least 40%, by weight, of amylose and more preferably at least 65%, by weight, of amylose.

One modification of the high amylose starches used in this invention that is especially advantageous is the etherification with alkylene oxides, particularly those containing 2 to 6, preferably 2 to 4, carbon atoms. Ethylene oxide, propylene oxide and butylene oxide are exemplary compounds useful in etherifying the starting starch materials, with propylene oxide being especially preferred. Varying amounts of such compounds may be used depending on the desired properties and economics. Generally, up to 15% or more and preferably, up to about 10%, by weight, based on the weight of starch will be used. Extruded starches modified in this manner, showed improved expansion, uniformity and resiliency.

Additive compounds may also be combined or blended with the starch starting material to improve properties such as strength, flexibility, water resistance, resiliency, flame retardancy, density, color, etc. as well as to provide repellency to insects and rodents, if needed or desired. Compounds such as polyvinyl alcohol, monoglycerides, and poly(ethylene vinyl acetate) are typical additives which may be used. Regarding flame retardants, there are many known compounds and classes of compounds which may be used including phosphorus containing compounds such as sodium phosphate, sodium triphosphate and ammonium phosphate, as well as sulfur containing compounds such as ammonium sulfate and ammonium sulfamate. Water resistance can also be improved using additives with styrene acrylate resins being one type that was found particularly effective. Density as well as resiliency and flexibility can be improved by incorporation of synthetics such as polyvinyl alcohol, polyvinyl acetate, polyurethane, polystyrene, poly (ethylene vinyl acetate) and polyvinylpyrrolidone. These additives may be used in any amount that will effectively satisfy the desired property, provided the extrusion of the starch and the overall properties of the expanded product are suitable. Typically, up to about. 50%, by weight of such additives, and preferably up to about 10% by weight, may be used. The additive compounds could be added either before or after drying of the starch depending on the particular materials and conditions used.

Another additive which can be added to the starch feed before it is dried is a small amount of a pregelatinized starch. This added material acts as a binding agent during drying and helps the starch maintain its particle size and prevents it from breaking or blowing apart. An amount of up to about 5% by weight and more particularly from about 2 to 3% can optionally be used if desired.

The starch materials having coarse particle size which are provided in accordance with the method of this invention as described herein are useful in various extrusion processes. Extrusion is a conventional well known technique used in many applications for processing plastics and starch materials. Starch extrusion has been involved in producing products such as films, foamed products, foods and confectioneries, gelatinized starches and more recently biodegradable shaped products as disclosed in U.S. Pat. Nos. 5,035,930 issued Jul. 30, 1991 and 5,043,196 issued Aug. 27, 1991.

Extrusion carried out in accordance with this invention will involve the selected coarse sized starch materials at a total moisture content of 25% or less by weight, based on the weight of starch. Temperatures in the extruder will vary depending on the particular material and application and, for example, can range from about 50° to 300° C. In a preferred embodiment, an expanded, biodegradable starch product having a uniform, closed cell structure with low density and good resilience and compressibility properties is obtained by extrusion of a high amylose starch, i.e., starch having at least 40% and preferably at least 65%, by weight, amylose at a total moisture content of 21% or less by weight and at a temperature of from about 150° to 250° C.

The apparatus used in carrying out the extrusion process may be any screw-type extruder. While the use of a single- or twin-screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be corotating and intermeshing or nonintermeshing. Each screw will comprise a helical flight or threaded section and typically will have a relatively deep feed section followed by a tapered transition section and a comparatively shallow constant-depth meter section. The screws, which are motor driven, generally fit snugly into the cylinder or barrel to allow mixing, heating and shearing of the material as it passes through the extruder.

Control of the temperature along the length of the extruder barrel is important and is controlled in zones along the length of the screw. Heat exchange means, typically a passage, such as a channel, chamber or bore located in the barrel wall, for circulating a heated media such as oil, or an electrical heater such as calrod or coil type heaters, is often used. Additionally, heat exchange means may also be placed in or along the shaft of the screw device.

Variations in any of the elements used in the extruder may be made as desired in accordance with conventional design practices in the field. A further description of extrusion and typical design variations can be found in "Encyclopedia of Polymer Science and Engineering", Vol. 6, 1986, pp. 571 to 631.

The invention is further illustrated by the following examples with all parts and percentages given by weight and all temperatures are in degrees Celsius unless otherwise noted.

EXAMPLE 1

To an aqueous slurry of starch (35% solids) comprising a high amylose corn starch of 70% amylose modified by hydroxypropylating with propylene oxide (5%), 2.0–2.5% of pregelatinized corn starch was added and mixed until the corn starch was dispersed. The slurry was then pumped to a rotary vacuum filter bed (manufactured by Komline-Sanderson) where a 0.5 inch filter cake was built up on the drum and then removed by strings attached to the drum which were pulled away from the drum. The drum was rotated about 0.75 revolutions before the starch was removed in the form of starch chunks (about 40% moisture) which dropped onto a moving conveyor and passed through a belt dryer, a Proctor & Schwartz SCF Single Conveyor Dryer. The starch was conveyed at the rate of 0.5 to 2 feet/min. (2000–4000 lbs/hr.) and was heated at 165° to 260° F. in the dryer by circulating air and steam coils. At the end of the dryer the starch passed a cooling section where it was cooled to about 120° F. The starch chunks were dried to about 8% moisture and after exiting the dryer, passed through a string catcher and then were blown into a storage hopper. The dried starch was now ready for further processing in an extruder and had the following particle size distribution.

| Screen Mesh Size | Screen Microns | Dried Sample % Retained |
| --- | --- | --- |
| 40 | 425 | 22.73 |
| 60 | 250 | 39.19 |
| 80 | 180 | 11.37 |
| 120 | 125 | 6.15 |
| 200 | 75 | 3.67 |
| Pan | — | 16.88 |
| % Retained on or above 80 Mesh Screen | | 73.29% |

EXAMPLE 2

For comparative purposes, similar starch samples were flash and rotary dried to moisture contents of about 6 to 8% and found to have the following particle size distribution.

| Screen Mesh Size | Screen Microns | Sample Flash Dried % Retained | Sample Rotary Dried % Retained |
| --- | --- | --- | --- |
| 40 | 425 | 0.22 | 0.62 |
| 60 | 250 | 0.44 | 1.52 |
| 80 | 180 | 0.59 | 1.42 |
| 120 | 125 | 0.76 | 2.02 |
| 200 | 75 | 1.64 | 5.32 |
| PAN | — | 96.42 | 89.11 |
| % Retained on or above 80 Mesh Screen | | 1.25 | 3.56 |

EXAMPLE 3

For further comparative purposes, to show the advantages of using the starches prepared in accordance with this invention in extrusion processing, samples of starch made as in Example 1 with varying amounts of starch having particle size >80 mesh and those made by flash and rotary drying as in Example 2, all having moisture contents of about 6 to 8%, were further processed in an extruder under the following conditions.

An APV-Baker MPV 50 mm twin screw extruder having an L/D=15, a screw speed of 400 rpm, a 2×4 mm die hole and barrel temperatures of the different zones in the extruder of 150°/200°/350°/350°/350° F. was used to process the starch samples with the following further conditions and results.

| Sample Starch | Total Moisture % | Particle Size % >80 mesh | Maximum Rate lbs/hr | Die Press psi | % Torque | Observations |
| --- | --- | --- | --- | --- | --- | --- |
| 1A (belt dried) | 17 | 35 | 200 | 300–335 | 60–65 | Stable |
| 1B (belt dried) | 17 | 62 | 300 | 450–475 | 85–90 | Stable |
| 1C (belt dried) | 17 | 71.5 | 300 | 450–460 | 85–90 | Stable |
| 2A (flash dried) | 17 | 1.25 | 75 | 150–900 | 40–70 | Unstable |
| 2B (rotary dried) | 17 | 3.56 | 90 | 200–700 | 50–85 | Unstable |

These examples show the advantageous extrusion processing conditions when extruding under low total moisture using the starch having coarse particle-size (1A, 1B and 1C) compared with those having smaller particle size (2A, 2B). This is exhibited by increased production rates, 200 to 300 lbs/hr. compared with 75 to 90 lbs/hr. as well as the more consistent (less variable) degree of die pressure (shows filling ability) and torque.

What is claimed is:

1. In a method of extruding starch having a total moisture content of 25% or less by weight based on the weight of starch, to form an expanded product, the improvement comprising feeding to the extruder an inlet feed which consists essentially of starch which is modified with up to 15% by weight of alkylene oxide containing 2 to 6 carbon atoms and having a particle size distribution such that 30% or more by weight of the starch has a particle size of from at least 180 to 2000 microns to form a product having a uniform, closed cell structure.

2. The method of claim 1 wherein 50% or more by weight of the starch has a particle size of at least 180 to 2000 microns.

3. The method of claim 1 wherein the starch fed to the extruder has a moisture content of about 15% or less by weight.

4. The method of claim 3 wherein 50% or more by weight of the starch has a particle size of at least 180 to 2000 microns.

5. The method of claim 1 wherein the starch comprises a starch containing at least 40% by weight amylose content.

6. The method of claim 5 wherein at least 50% or more by weight of the starch has a particle size of at least 180 to 2000 microns.

7. The method of claim 5 wherein the starch fed to the extruder has a moisture content of about 15% or less by weight.

8. The method of claim 7 wherein at least 50% or more by weight of the starch has a particle size of at least 180 to 2000 microns.

9. The method of claim 8 wherein the total moisture content of the starch in the extruder is 21% or less by weight.

10. The method of claim 1 wherein the starch fed to the extruder is obtained from an aqueous starch slurry which has been dried in a continuous belt dryer.

11. The method of claim 10 wherein 50% or more by weight of the starch has a particle size of at least 180 to 2000 microns.

12. The method of claim 10 wherein the starch fed to the extruder has a moisture content of about 15% or less by weight.

13. The method of claim 12 wherein 50% or more by weight of the starch has a particle size of at least 180 to 2000 microns.

14. The method of claim 10 wherein the starch comprises a starch containing at least 40% by weight of amylose content.

15. The method of claim 14 wherein 50% or more by weight of the starch has a particle size of at least 180 to 2000 microns.

16. The method of claim 14 wherein the starch fed to the extruder has a moisture content of about 15% or less by weight.

17. The method of claim 16 wherein 50% or more by weight of the starch has a particle size of at least 180 to 2000 microns.

18. The method of claim 17 wherein the total moisture content of the starch is 21% or less by weight.

19. The method of claim 1 wherein the total moisture content of the starch in the extruder is from about 5 to 25% by weight and the starch fed to the extruder has a moisture content of from about 5 to 12% by weight.

20. The method of claim 19 wherein the starch fed to the extruder is obtained from an aqueous starch slurry which has been dried in a continuous belt dryer.

* * * * *